United States Patent [19]
Carter

[11] 3,717,211
[45] Feb. 20, 1973

[54] SPRING MOUNTING FOR SNOWMOBILE BOGIE WHEELS

[75] Inventor: Harry R. Carter, Moscow, Pa.

[73] Assignee: Poloron Products, Inc., New Rochelle, N.Y.

[22] Filed: March 18, 1970

[21] Appl. No.: 20,729

[52] U.S. Cl. .................................. 180/5 R, 305/27
[51] Int. Cl. ................................................ B62d 55/16
[58] Field of Search .......... 180/5; 305/27; 280/124 R; 301/133; 267/58

[56] References Cited

UNITED STATES PATENTS

| 3,309,150 | 3/1967 | Marier | 305/27 |
| 3,533,662 | 10/1970 | Richards | 305/27 |
| 2,721,766 | 10/1955 | Kramcsak | 301/133 |
| 2,250,797 | 7/1941 | Garlinghouse | 280/124 X |
| 3,474,751 | 10/1969 | Hebert | 305/27 UX |
| 800,377 | 9/1905 | Kurtz | 16/44 |
| 2,923,961 | 2/1960 | Black | 16/44 |

Primary Examiner—Richard J. Johnson
Attorney—Eugene E. Geoffrey, Jr.

[57] ABSTRACT

An improved bogie wheel structure for snowmobiles and similar vehicles utilizing helical springs carried by a transverse shaft with the ends of the springs extending outwardly and carrying axles, each supporting a plurality of bogie wheels.

11 Claims, 7 Drawing Figures

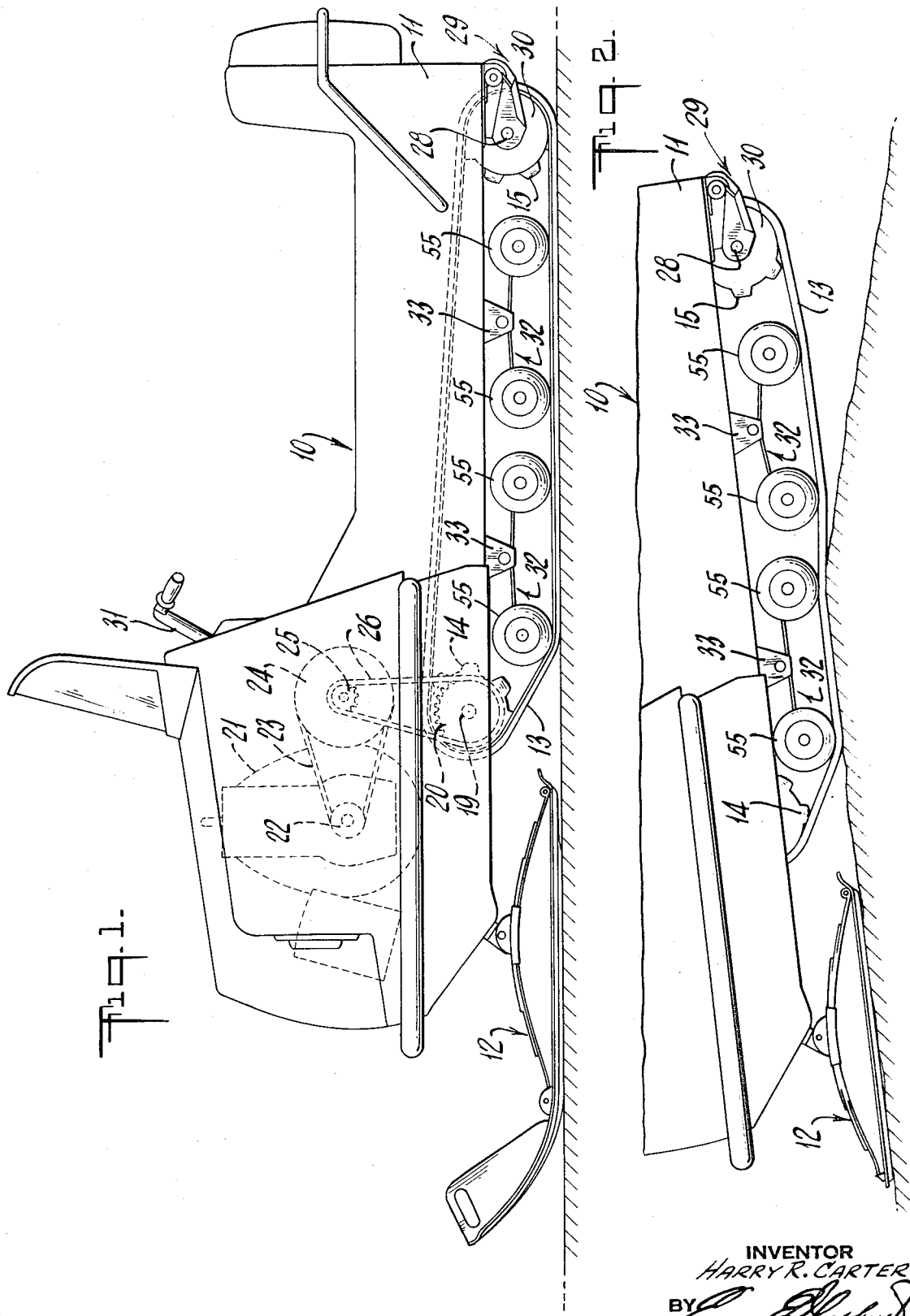

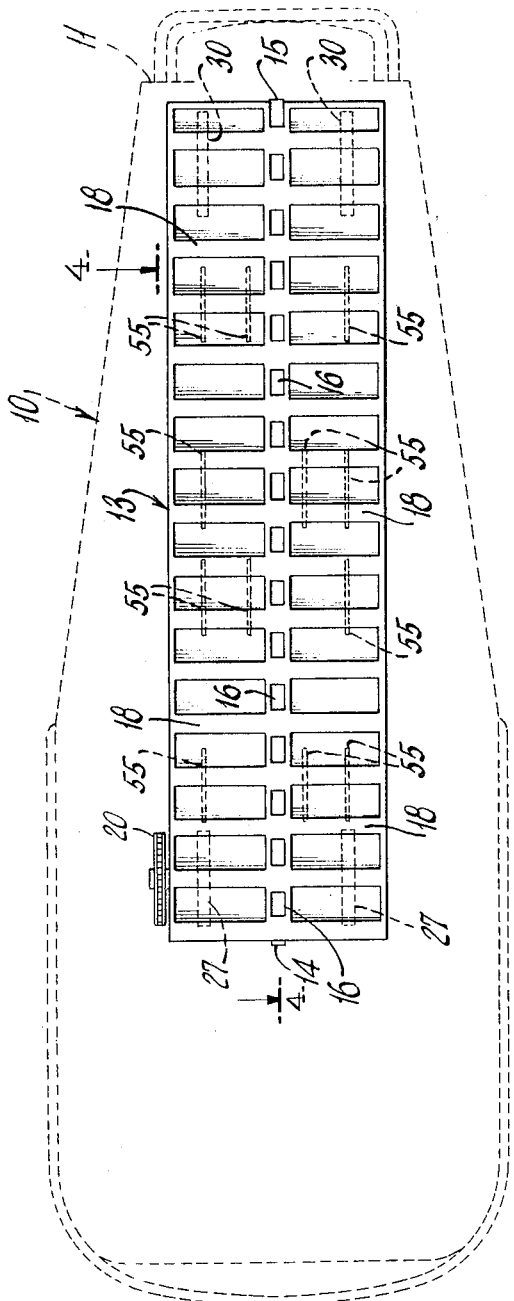
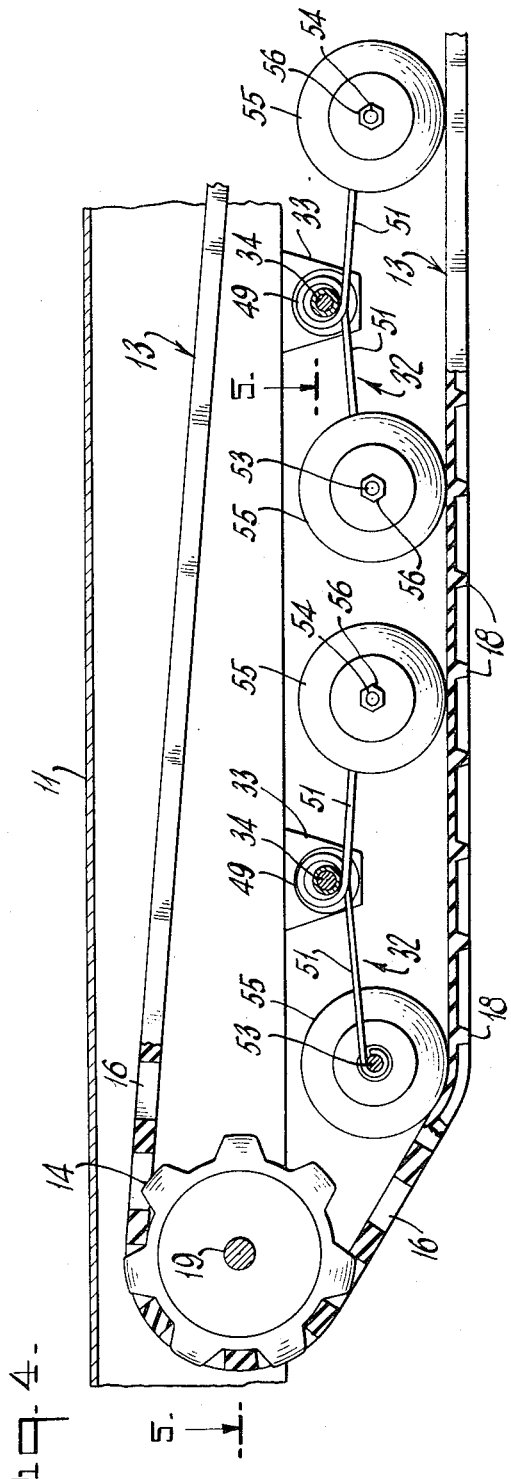

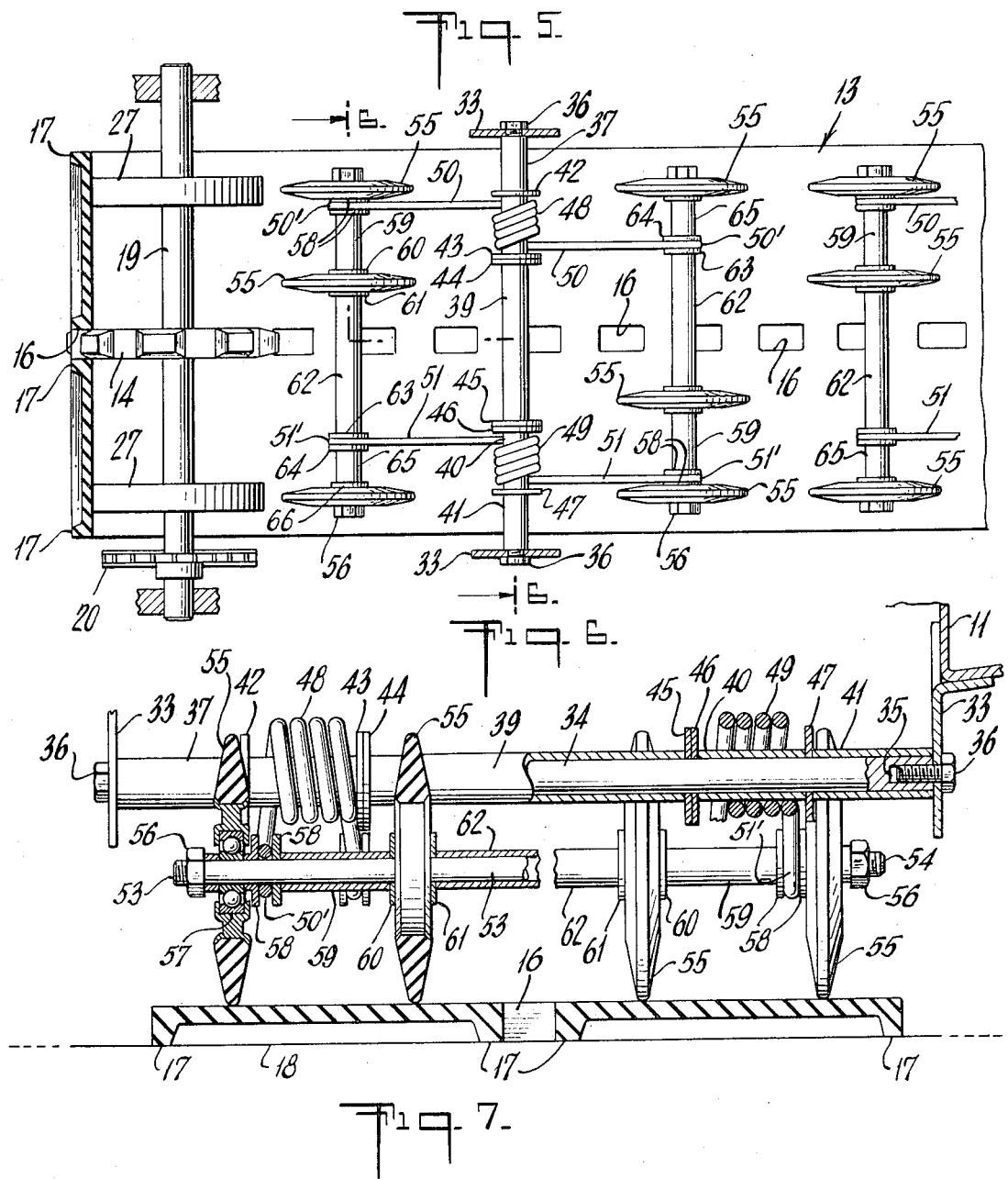

SPRING MOUNTING FOR SNOWMOBILE BOGIE WHEELS

This invention relates to bogie wheel structures for vehicles utilizing tracks of rubber or other materials, and more specifically, to a novel and improved bogie wheel structure particularly useful for snowmobiles utilizing a rubber or plastic track as the driving means.

When utilizing an elongated flexible track as the driving means for a vehicle, the track is generally supported by front and rear rotary members at least one of which engages the track in order to supply the driving force. A plurality of idler wheels or bogie wheels are positioned between the front and rear rotary members and are secured to the frame of the vehicle. These bogie wheels ride on the bottom portion of the track and provide the basic vehicular support so that the bottom part of the track supports the weight of the vehicle. In connection with snowmobiles, the bogie wheels are spring mounted in order to cushion the ride and the forward end of the snowmobile is supported by a pair of skis which are also utilized as the steering means.

Known bogie wheel structures usually involve relatively complicated designs utilizing a central transverse shaft which is secured to the vehicle body, sleeves carrying outwardly extending rods rotatably carried by said shaft and bogie wheels supported at the outer ends of the rods. Suitable springs are also carried by the shaft and bear downwardly on the rods to provide a spring action. These prior known structures are relatively difficult and expensive to manufacture and known structures permit the bogie wheel assemblies to rotate through 180° when the vehicle is operated on rough terrain. Furthermore, the axis of the shaft and the axes of the axles are always maintained in parallel relationship.

This invention provides an improved bogie wheel structure which is not only easier to fabricate but also greatly reduces manufacturing cost and at the same time permits the bogie wheel axles to tilt relative to the supporting shaft as well as to move angularly about the shaft.

By reason of this improved structure, the bogie wheels can be arranged to provide the desired support for the vehicle and at the same time cannot be displaced from their normal operative position. With known prior art structures, when the snowmobile is operated at high speeds, the body of the vehicle is often thrown upwardly relieving pressure of the bogie wheels against the bottom of the track. Inasmuch as the track is rotating, it will flip over the wheel assemblies so that they cannot perform their proper function. With this invention the bogie wheel structure involves an improved arrangement and deposition of the wheels which not only affords substantially uniformly distributed weight on the bottom portion of the track but also enables the structure to be fabricated so that the structure cannot flip even under conditions wherein all of the vehicular weight is removed from the bottom of the track.

The objectives of this invention are attained through a simplified arrangement of elements which includes a supporting shaft having at least two helical springs with the ends of the springs extending outwardly and downwardly and terminating in arcuate end portions encircling and supporting a pair of axles. In utilizing the structure for a snowmobile wherein the track has a plurality of central apertures for engaging a pair of sprockets one of which is driven, each axle is provided with three wheels with the center wheel being offset in one direction on one axle and in the other direction on the other axle in order to avoid engagement of the wheels with the sprocket holes in the track. With this wheel arrangement two bogie wheel structures will provide the necessary support under conditions wherein the ground contacting portion of the track is in the neighborhood of 4 to 5 feet in length.

The above and other objects of the invention will become more apparent from the following description and accompanying drawings forming part of this application.

In the drawings:

FIG. 1 is a side elevational view of a snowmobile including the improve bogie wheel structure in accordance with the invention;

FIG. 2 is a fragmentary side elevational view of the structure shown in FIG. 1 illustrating the operation of the bogie wheels on rough terrain;

FIG. 3 is a bottom view of the snowmobile track shown in FIG. 1 with portions of the snowmobile body in dotted outline;

FIG. 4 is a cross-sectional view taken along the line 4—4 of FIG. 3;

FIG. 5 is a cross-sectional view of FIG. 4 taken along the line 5—5 thereof;

FIG. 6 is a cross-sectional view of FIG. 5 taken along the line 6—6 thereof and with portions shown in elevation; and FIG. 7 is a perspective view of the bogie wheel structure in accordance with the invention.

Referring now to the drawings, the snowmobile is generally denoted by the numeral 10 and includes a body 11 supported at the forward portion by a pair of skis 12 and at the rear by an elongated endless track 13. The track 13 is supported by front and rear sprockets 14 and 15 which sprockets engage openings 16 uniformly spaced about the center line of the belt. In the illustrated embodiment of the invention, the belt 13 is formed of a suitable flexible material such as rubber or the like and is provided with outwardly facing longitudinal ribs 17 and transverse ribs 18 in order to provide adequate frictional contact with the ground.

The sprocket 14 is fixed to a shaft 19 which is rotatably carried by the body 11. The outer end of the shaft 19 carries a sprocket 20 which is coupled to the engine 21 through a drive train including a torque converter 22, a belt 23, a pulley 24, a sprocket 25, and a chain 26, the latter coupling the sprocket 25 with the sprocket 20. The shaft 19 also carries a pair of rollers 27 to support and stabilize the outer edges of the track 13. The rear sprocket 15 is similarly secured to a shaft 28, the latter being rotatably carried by adjustable supports generally denoted by the numeral 29 and having a pair of stabilizing rollers 30 corresponding to the rollers 27 on the shaft 19. The skis 12 are rotatably mounted on the body and are operated by the steering column 31 to control the direction of the vehicle.

The bogie wheel assemblies are generally denoted by the numeral 32 and are carried by brackets 33 welded or otherwise secured to the side edges of the body 11 as may be observed for instance in FIG. 6. A perspective view of the improved bogie wheel assembly is illustrated in FIG. 7.

More particularly, the bogie wheel assembly includes a central transverse shaft 34 having threaded openings 35 on the ends thereof for receiving cap screws 36 to secure the shaft in position between opposing brackets 33. The shaft 34 carries a series of sleeves 37, 38, 39, 40, and 41 with the individual sleeves being separated by washers 42 through 47. A helical spring 48 surrounds the sleeve 38 and is held in position between washers 42 and 43. A second helical spring 49 surrounds the sleeve 40 and is retained in position between the washers 46 and 47. The helical spring 48 has a pair of outwardly extending arms 50 and the helical spring 49 has a similar pair of outwardly extending arms 51. The outer ends of the arms 50 and 51 are curved to form closed eyes 50' and 51' having an internal diameter substantially equal to the outside diameter of the bogie wheel axles 53 and 54 which carry the bogie wheels 55.

Since the two bogie wheel axle assemblies are identical, only the assembly embodying the axle 53 will be described. The outer ends of the axle 53 are threaded to receive nuts 56. Each of the bogie wheels 55 have integrally formed bearings 57 adapted to slidably engage the axle 53. Referring more specifically to FIGS. 5 and 6, the upper or lefthand end of the axle 53, as the case may be, carries a first bogie wheel 55. The eye 50' on the spring arm 50 engages the axle adjoining the first bogie wheel and is retained between a pair of washers 58. The next or central bogie wheel is spaced by a sleeve 59 and a washer 60. The remaining bogie wheel as will be observed more clearly in FIG. 7 is spaced from the central bogie wheel by a washer 61 and a sleeve 62, a washer 63, the eye 51' of the spring arm 51, a washer 64, a sleeve 65, and a washer 66. The entire assembly is then held in position by engagement of the nuts 56 with the axle 53. The bogie wheel axle 54 is similarly arranged but with the elements reversed.

With the foregoing arrangement, it will be observed that the axles 53 and 54 and the shaft 34 can be formed of standard rod stock with the shaft 34 merely having holes drilled and tapped in the ends thereof and the axles 53 and 54 merely having threaded end portions. The spacer sleeves on both the shaft 34 as well as the axles 53 and 54 can be formed of standard tubing. The washers can be fabricated by ordinary punch-press procedures, and since the wheels 55 are each formed with their own bearings, the only machining required involves the threading of the shaft and axles and cutting the sleeves to the desired length. More-over, the tolerances are not critical. Through the utilization of at least three wheels on each of the axles, it is possible in snowmobiles wherein the track length contacting the ground is of the order of 4 to 5 feet to obtain substantially uniform distribution of weight on the track by merely using two sets of bogie wheels 32. Furthermore, because of the distance between the bogie wheel axles 53 and 54 and the utilization of relatively heavy helical springs 48 and 49, the bogie wheels cannot under any circumstances rotate through a 180° angle with the result that a more dependable and reliable vehicle is produced.

In addition, the helical spring arms are independently movable so that the axles 53 and 54 cannot only move about the shaft 34 but can individually tilt relative thereto. In this way, the wheels exert more uniform pressure on the track under all conditions of operation.

While only one embodiment of the invention has been illustrated and described, it is apparent that alterations, modifications and changes may be made without departing from the true scope and spirit thereof as defined by the appended claims.

What is claimed is:

1. In a snowmobile, a frame, an endless track, means at the ends of said track rotatably carried by said frame and supporting said track with one of said means being driven, and at least one bogie wheel assembly carried by said frame with the wheels bearing against the inner side of the lower track portion to support said frame, said assembly including a laterally extending shaft secured to said frame, helical spring means surrounding said shaft, said spring means forming arms extending outwardly therefrom and in opposite directions and bogie wheels rotatably carried solely by the outer ends of the arms of said spring means, whereby the wheel carried by one spring arm is on one side of said shaft and the wheel carried by the other spring arm is on the other side of said shaft.

2. In a snowmobile according to claim 1 wherein said spring means comprises at least two helical springs each having a pair of oppositely extending arms.

3. In a snowmobile according to claim 2 wherein said assembly includes a pair of axles and wherein said spring arms engage said axles and each of said axles carry at least two bogie wheels.

4. In a snowmobile according to claim 3 wherein said shaft includes sleeves for maintaining said springs in spaced relationship and said axles each include sleeves for holding said wheels in a predetermined relationship relative to said arms.

5. In a snowmobile according to claim 4 wherein each axle includes three wheels with the central wheel on one axle being disposed on one side of a central longitudinal plane and the central wheel on the other axle being positioned on the other side of said plane.

6. In a snowmobile according to claim 2 wherein said shaft includes means for holding said helical springs in predetermined spaced relationship.

7. In a snowmobile according to claim 6 wherein said holding means includes individual sleeves disposed between said helical springs and said shaft.

8. A bogie wheel assembly for vehicles comprising a shaft having means for attachment to said vehicle, a pair of helical springs carried by said shaft and in spaced relationship one to the other, said springs each having a pair of outwardly and oppositely extending arms, a pair of axles each carried solely by the outer ends of a pair of said arms and bogie wheels carried by said axles whereby said axles are mechanically and resiliently supported solely by said arms.

9. A bogie wheel assembly according to claim 8 including a plurality of sleeves rotatably carried by said shaft with said helical springs surrounding at least certain of said sleeves and means for maintaining said springs in a predetermined spaced relationship.

10. A bogie wheel assembly according to claim 9 wherein the last said means comprise washers disposed between said sleeves and having outside diameters greater than the outside diameters of said sleeves.

11. A bogie wheel assembly according to claim 10 wherein the ends of said arms each encircle its associated axle and said axles each include a plurality of rotatably carried sleeves for maintaining said arms and wheels in predetermined spaced relationship.

* * * * *